US012013035B2

(12) United States Patent
Contreras et al.

(10) Patent No.: US 12,013,035 B2
(45) Date of Patent: Jun. 18, 2024

(54) CYLINDER HEAD GASKET ASSEMBLY

(71) Applicant: Federal-Mogul Motorparts LLC, Southfield, MI (US)

(72) Inventors: Abel Contreras, Berkeley, IL (US); Sean Smith, Aurora, IL (US); Brent Loomis, Chicago, IL (US)

(73) Assignee: Federal-Mogul Motorparts LLC, Northville, MI (US)

( * ) Notice: Subject to any disclaimer, the term of this patent is extended or adjusted under 35 U.S.C. 154(b) by 693 days.

(21) Appl. No.: 16/780,360

(22) Filed: Feb. 3, 2020

(65) Prior Publication Data
US 2020/0271225 A1 Aug. 27, 2020

Related U.S. Application Data

(60) Provisional application No. 62/810,052, filed on Feb. 25, 2019.

(51) Int. Cl.
F16J 15/08 (2006.01)
F02F 11/00 (2006.01)
(52) U.S. Cl.
CPC ......... *F16J 15/0818* (2013.01); *F02F 11/002* (2013.01)
(58) Field of Classification Search
CPC .. F16J 15/0818; F16J 15/0825; F16J 15/0831; F16J 2015/0875; F02F 11/002
See application file for complete search history.

(56) References Cited

U.S. PATENT DOCUMENTS

| 3,924,314 | A |   | 12/1975 | Ferchland |             |
|-----------|---|---|---------|-----------|-------------|
| 3,941,393 | A | * | 3/1976  | Bainard   | F16J 15/328 |
|           |   |   |         |           | 277/569     |
| 4,480,844 | A |   | 11/1984 | Kozerski  |             |
| 4,605,236 | A | * | 8/1986  | Tsuchihashi | F16J 15/123 |
|           |   |   |         |           | 277/601     |
| 4,759,266 | A |   | 7/1988  | Murray    |             |
| 4,776,601 | A | * | 10/1988 | Yamada    | F16J 15/0831 |
|           |   |   |         |           | 277/601     |
| 5,120,078 | A | * | 6/1992  | Udagawa   | F16J 15/0825 |
|           |   |   |         |           | 277/651     |

(Continued)

FOREIGN PATENT DOCUMENTS

| DE | 4222249 A1    | 1/1994  |
| GB | 2096246 A     | 10/1982 |
| KR | 2019980028105 U | 8/1998 |

OTHER PUBLICATIONS

Notification Concerning Transmittal of International Preliminary Report on Patentability dated Sep. 2, 2021 (7 Pages).

*Primary Examiner* — Eugene G Byrd
*Assistant Examiner* — L. Susmitha Koneru
(74) *Attorney, Agent, or Firm* — Federal-Mogul Motorparts LLC

(57) ABSTRACT

A cylinder head gasket assembly includes a gasket and a wire. The gasket has a first side, a second side, and a cylinder bore opening extending through the first side and the second side. The gasket has a wall on the first side. The wall extends axially along the cylinder bore opening. The gasket has a ledge extending from the wall into the cylinder bore opening at the second side. The wire is ring-shaped. The wire is on the ledge and extends along the wall. Wax adheres the wire to the ledge.

20 Claims, 3 Drawing Sheets

(56) References Cited

U.S. PATENT DOCUMENTS

| | | | | |
|---|---|---|---|---|
| 5,255,926 A * | 10/1993 | Udagawa | | F16J 15/123 |
| | | | | 277/595 |
| 5,275,139 A * | 1/1994 | Rosenquist | | F16J 15/123 |
| | | | | 123/193.3 |
| 5,297,807 A * | 3/1994 | Udagawa | | F16J 15/123 |
| | | | | 277/597 |
| 5,343,837 A * | 9/1994 | Ward | | F16J 15/123 |
| | | | | 123/193.5 |
| 5,408,963 A * | 4/1995 | Miyaoh | | F16J 15/0825 |
| | | | | 123/193.3 |
| 5,410,997 A * | 5/1995 | Rosenquist | | F16J 15/123 |
| | | | | 166/402 |
| 5,482,014 A * | 1/1996 | Rosenquist | | F16J 15/123 |
| | | | | 123/193.3 |
| 5,603,515 A * | 2/1997 | Bock | | H04W 48/12 |
| | | | | 277/591 |
| 5,803,462 A * | 9/1998 | Kozerski | | F16J 15/0825 |
| | | | | 277/595 |
| 5,938,210 A * | 8/1999 | Schatzle | | F16J 15/064 |
| | | | | 277/936 |
| 7,726,940 B2 | 6/2010 | Snowsill | | |
| 8,720,898 B2 | 5/2014 | Shires | | |
| 8,746,701 B2 | 6/2014 | Tomas | | |
| 9,441,574 B2 * | 9/2016 | Zurfluh | | B29C 45/14336 |
| 9,988,919 B2 | 6/2018 | Davis et al. | | |
| 10,082,103 B2 * | 9/2018 | Zurfluh | | F16J 15/123 |
| 2003/0057655 A1 | 3/2003 | Chehab et al. | | |
| 2008/0093807 A1 | 4/2008 | Flemming | | |
| 2012/0199045 A1 | 8/2012 | Tomas | | |
| 2013/0033008 A1 | 2/2013 | Martin et al. | | |
| 2014/0261287 A1* | 9/2014 | Zurfluh | | F02F 11/002 |
| | | | | 29/888.3 |
| 2016/0115806 A1 | 4/2016 | Davis et al. | | |
| 2016/0177762 A1 | 6/2016 | Sarawate et al. | | |

* cited by examiner

CYLINDER HEAD GASKET ASSEMBLY

CROSS-REFERENCE TO RELATED APPLICATIONS

This patent application claims priority to and all the benefits of U.S. Provisional Patent Application No. 62/810,052 filed on Feb. 25, 2019, which is herein incorporated by reference in its entirety.

BACKGROUND

Multi-layer metal gasket assemblies are employed in internal combustion engines to establish a plurality of fluid-tight seals around a number of cylinder bores on an engine. Such gasket assemblies may include two or more sheet-like functional and/or distance gasket layers that are in a stacked relationship and sandwiched between a cylinder block and a cylinder head. A wire may be compressed between the gasket and the cylinder head to seal between the gasket and the cylinder head. Placement of the wire relative to the gasket during assembly of the cylinder head to the cylinder block is important for proper sealing therebetween.

DETAILED DESCRIPTION

Figure 1:
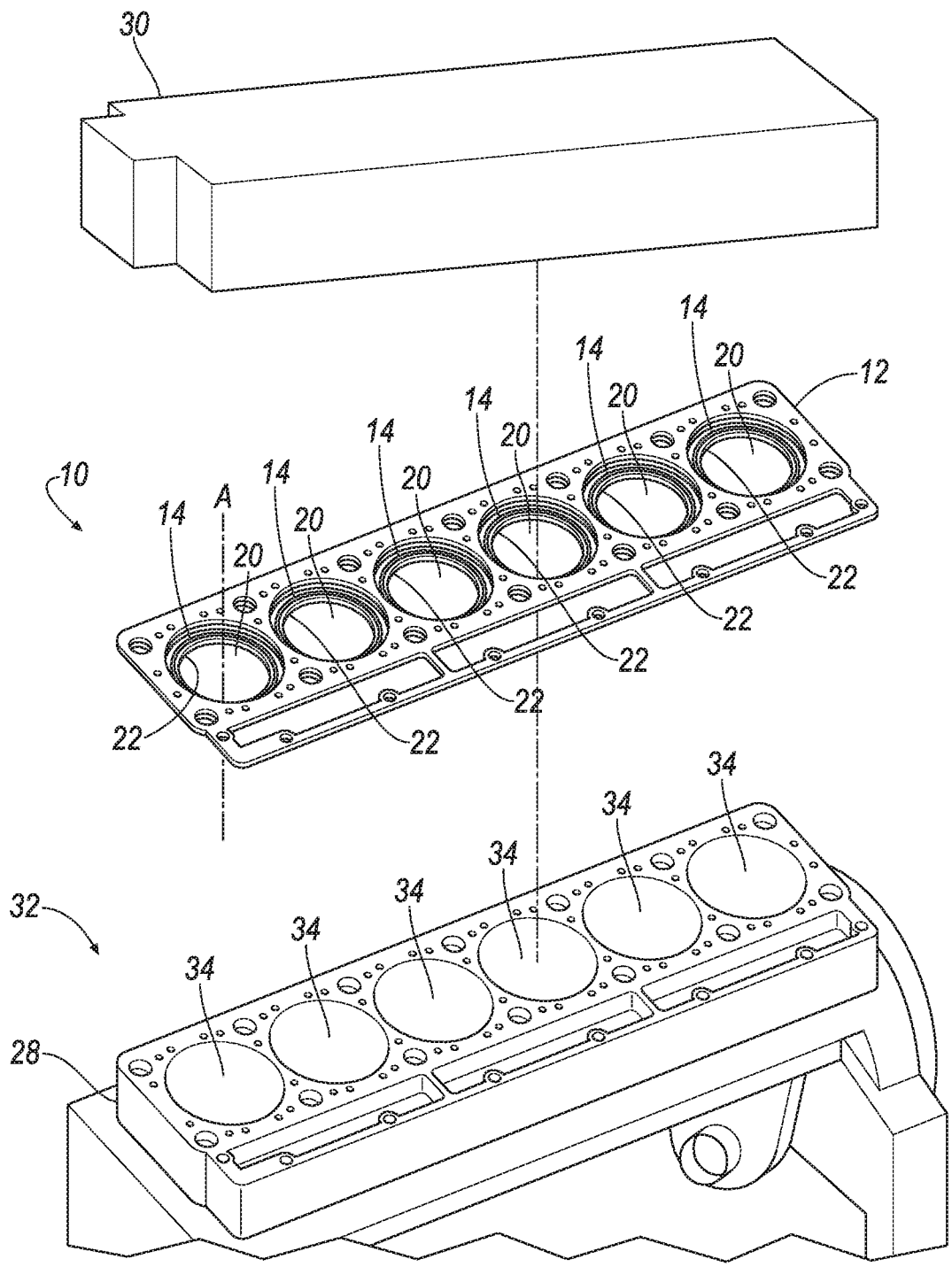
FIG. 1 is an exploded view of an engine including a cylinder block a cylinder head, and a cylinder head gasket assembly therebetween.

With reference to the Figures, wherein like numerals indicate like parts throughout the several views, a cylinder head gasket assembly 10 includes a gasket 12 and a wire 14. The gasket 12 has a first side 16, a second side 18, and a cylinder bore opening 20 extending through the first side 16 and the second side 18. The gasket 12 has a wall 24 on the first side 16. The wall 24 extends axially along the cylinder bore opening 20. The gasket 12 has a ledge 22 extending from the wall 24 into the cylinder bore opening 20 at the second side 18. The wire 14 is on the ledge 22 and extends along the wall 24. Wax 26 adheres the wire 14 to the ledge 22.

Figure 2:
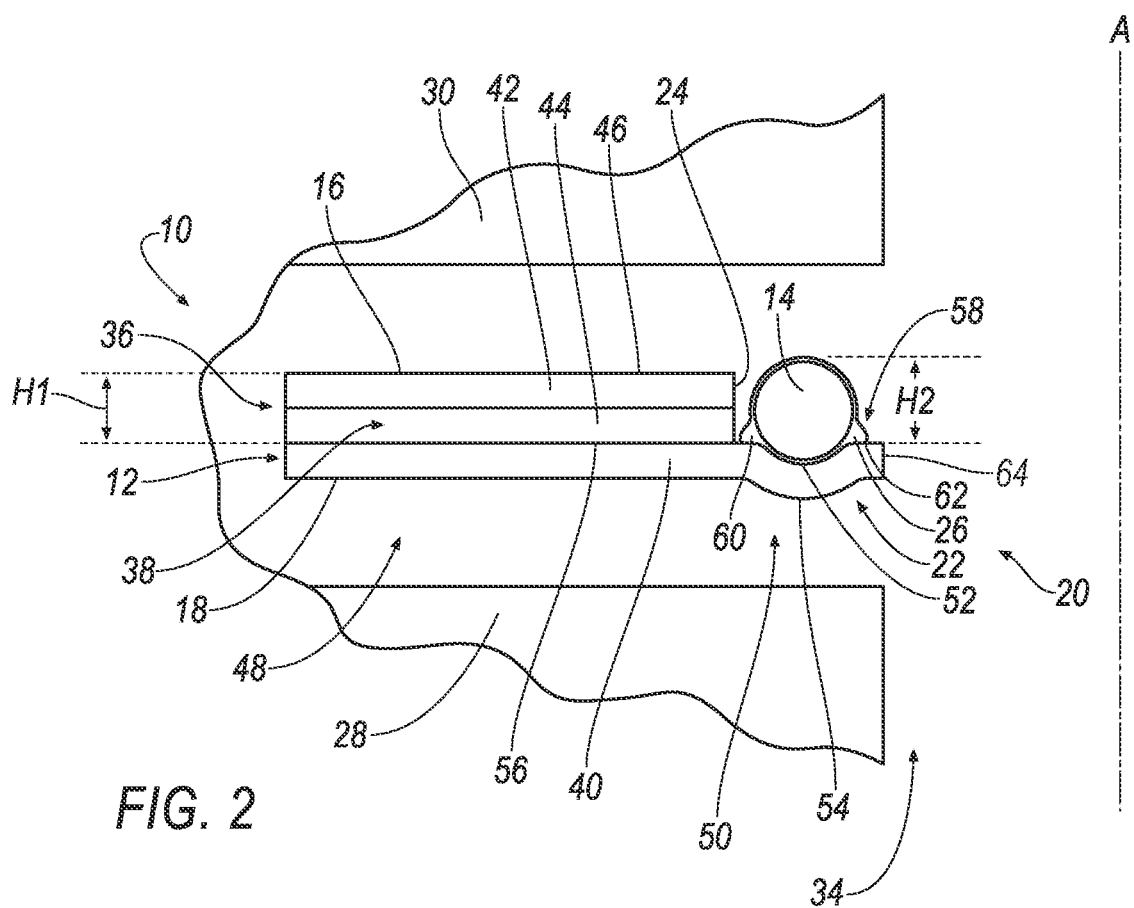
FIG. 2 is a cross-sectional view of the engine before assembly of the cylinder block to the cylinder head.

With reference to FIGS. 1 and 2, before and during assembly of the cylinder head gasket assembly 10 to a cylinder block 28 and a cylinder head 30 of an engine 32, the wire 14 is retained on the ledge 22 by the wax 26. As an example, the wax 26 retains the position of the wire 14 relative to the gasket 12 (specifically the ledge 22) so that the force of gravity does not move the wire 14 relative to the gasket 12 during handling of the cylinder head gasket assembly 10, e.g., during assembly to the cylinder block 28 and the cylinder head 30. Thus, the wax 26 ensures proper placement of the wire 14 relative to the gasket 12 during assembly of the cylinder head gasket assembly 10 to the cylinder block 28 and the cylinder head 30. As described further below, the wax 26 is intended to retain the position of the wire 14 until assembly to the cylinder block 28 and the cylinder head 30 and is dissolved thereafter, i.e., the wax 26 is sacrificial. The wax 26 dissolves during initial operation of the engine 32.

With reference to FIG. 1, the engine 32 includes the cylinder block 28 and the cylinder head 30. The cylinder block 28 and the cylinder head 30 in combination define a cylinder bore 34. As is known, the cylinder block 28 houses pistons in the cylinder bores 34. The cylinder head 30 defines a combustion chamber. The engine 32 may be any suitable type of internal combustion engine including a gasoline engine, diesel engine, etc.

The cylinder head gasket assembly 10 includes the gasket 12 and the wire 14, as introduced above. The cylinder head gasket assembly 10 extends from the cylinder block 28 to the cylinder head 30 and seals between the cylinder block 28 and the cylinder head 30. Specifically, the cylinder head gasket assembly 10 seals around the cylinder bores 34. As described further below, the wire 14 is compressed between the cylinder block 28 and the cylinder head 30 to seal around the cylinder bore 34.

As set forth above, the cylinder bore opening 20 extends through the first side 16 and the second side 18. In other words, the cylinder bore opening 20 has open ends. The cylinder bore opening 20 extends through the gasket 12 along an axis A. When assembled to the engine 32, the cylinder bore opening 20 is axially aligned with the cylinder bore 34 of the cylinder block 28. The cylinder bore opening 20 may be cylindrical or may be any other suitable shape.

Figure 3:
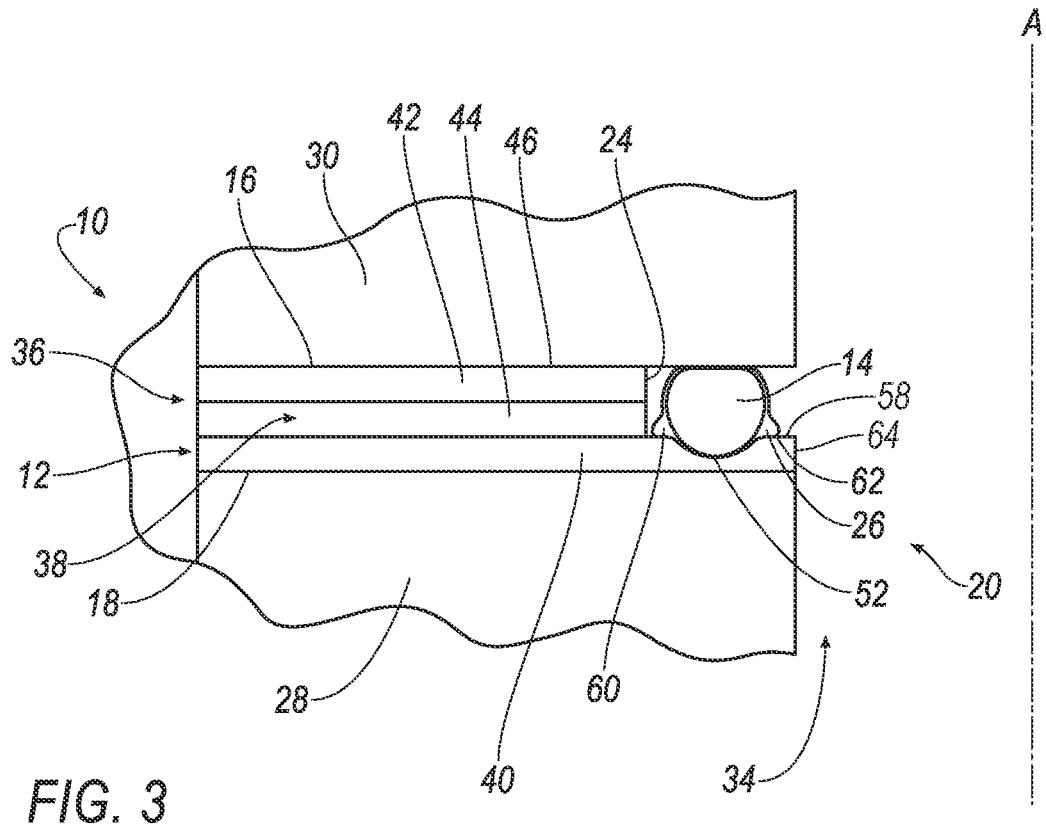
FIG. 3 is a cross-sectional view of the engine after assembly of the cylinder block to the cylinder head prior to operation of the engine.
Figure 4:
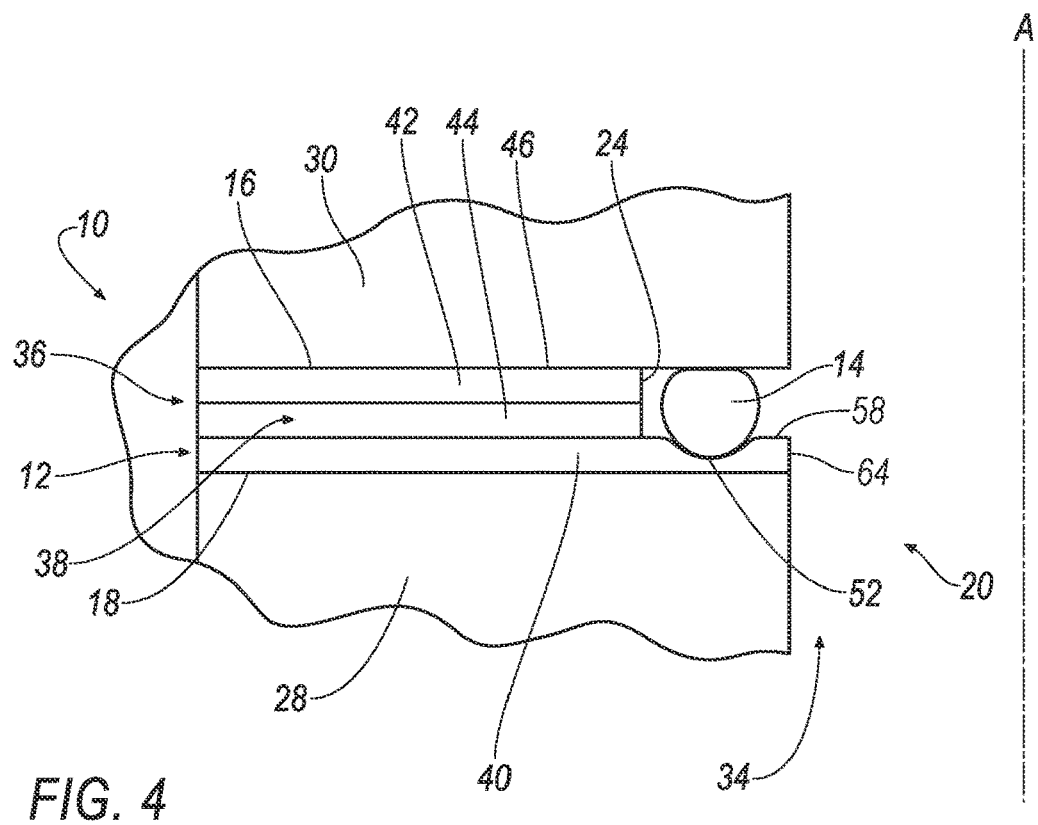
FIG. 4 is a cross-sectional view of the engine after assembly of the cylinder block to the cylinder head after to operation of the engine.
Figure 5:
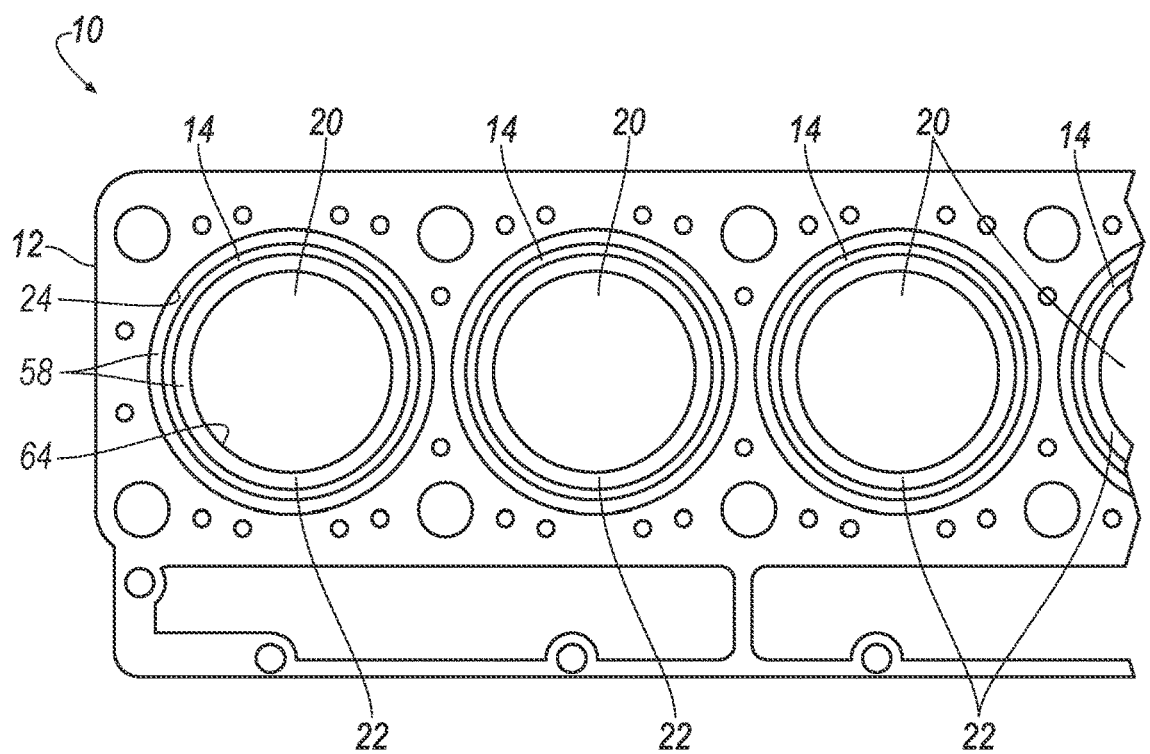
FIG. 5 is a top view of the cylinder head gasket assembly.

With reference to FIGS. 2-4, the gasket 12 includes a thick region 36 and the ledge 22 extends from the thick region 36 around each cylinder bore opening 20. The thick region 36 is thicker axially along the cylinder bore opening 20, i.e., along the axis A of the cylinder bore opening 20, than the ledge 22. The ledge 22 is endless around the cylinder bore opening 20. As an example, the ledge 22 is ring-shaped.

The first side 16 of the gasket 12 abuts one of the cylinder block 28 and the cylinder head 30 and the second side 18 of the gasket 12 abuts the other of the cylinder block 28 and the cylinder head 30. The thick region 36 extends from the first side 16 to the second side 18 of the gasket 12. The ledge 22 extends from the thick region 36 at the first side 16 radially into the cylinder bore opening 20. When assembled to the cylinder block 28 and the cylinder head 30, the thick region 36 abuts both the cylinder block 28 and the cylinder head 30. When assembled, the ledge 22 abuts one of the cylinder block 28 and the cylinder head 30 and the wire 14 extends from the ledge 22 to the other of the cylinder block 28 and the cylinder head 30. Specifically, the wire 14 is compressed between the ledge 22 and the other of the cylinder block 28 and the cylinder head 30. In the example shown in the Figures, the ledge 22 abuts the cylinder block 28 and the wire 14 extends from the ledge 22 to the cylinder head 30. Prior to assembly to the cylinder block 28 and the cylinder head 30, the wax 26 may be between the wire 14 and the ledge 22.

The gasket 12 may include a plurality of layers stacked on each other, i.e., along the axis A. For example, the gasket 12 may include a first layer 38 and a second layer 40. The gasket 12 terminates along the axis A at the first layer 38 and at the second layer 40. The first layer 38 and/or the second layer 40 may also include additional layers. In the example shown in the Figures, the first layer 38 includes a distal layer 42 spaced from the second layer 40 and a proximate layer 44 between the second layer 40 and the distal layer 42. In that example, the proximate layer 44 extends from the second layer 40 to the distal layer 42, i.e., abuts both the second layer 40 and the distal layer 42. As other examples, the first layer 38 and/or the second layer 40 may include any suitable number of layers, i.e., one or more, that are stacked and abutting. Each layer of the gasket 12 is sheet-like, i.e., each layer is thin relative to the length and width of the layer. The first layer 38 and the second layer 40 may be retained together in any suitable fashion.

The first layer 38 and the second layer 40, in combination, define the thick region 36 of the gasket 12. The second layer 40 extends from the thick region 36 into the cylinder bore opening 20 to define the ledge 22. The ledge 22 may be defined entirely by the second layer 40, as shown in the Figures.

The gasket 12 is metal. Specifically, the first layer 38 and the second layer 40 are metal. As examples, the gasket 12 may be steel, steel alloy, etc. The first layer 38 and the second layer 40 may be of the same type of material or different types of material. In examples in which the first layer 38 and/or the second layer 40 include additional layers, the additional layers may be of the same type of material or different types of material.

The first layer 38 is planar. Specifically, the entire first layer 38 may be planar, i.e., the entire first layer 38 may be flat in a plane. The first layer 38 has a planar surface 46 on the first side 16. Specifically, the distal layer 42 includes the planar surface 46. As shown in the Figures, the planar surface 46 may extend along the entire first layer 38, i.e., in the example in the Figures in which the entire first layer 38 may be planar. In the example shown in the Figures, the entire distal layer 42 and the entire proximate layer 44 are both planar. The planar surface 46 of the first layer 38 terminates at the cylinder bore opening 20.

With continued reference to FIGS. 2-4, the first layer 38 includes the wall 24. Specifically, the first layer 38 terminates at the cylinder bore 34 and extends peripherally around the cylinder bore 34 to define the wall 24. In the example shown in the Figures, the distal layer 42 and the proximate layer 44 both terminate at the cylinder bore 34 to define the wall 24, i.e., the wall 24 is defined by terminal edges of both the distal layer 42 and the proximate layer 44.

The wall 24 is on the first side 16 of the gasket 12. Specifically, the wall 24 extends from the ledge 22 to the planar surface of the first layer 38. The wall 24 is endless around the axis A. The wall 24 may be cylindrical, as shown in the Figures. The wall 24 may extend axially along the cylinder bore opening 20. In examples in which the wall 24 is cylindrical, the wall 24 may be annular about the axis A, i.e., the axis A is central.

The second layer 40 includes a planar portion 48 and a grooved portion 50. The grooved portion 50 includes the groove 52. The planar portion 48 abuts the first layer 38, e.g., the proximate layer 44. The planar portion 48 abuts one of the cylinder block 28 and the cylinder head 30 when the cylinder head gasket assembly 10 is assembled to the cylinder block 28 and the cylinder head 30. The grooved portion 50 may have a convex surface 54 and the planar portion 48 has a planar surface 56. As set forth below, the convex surface 54 abuts and is compressed against one of the cylinder block 28 and the cylinder head 30 (for example, abutting the cylinder block 28 is shown in the Figures).

With reference to FIGS. 2-5, as set forth above, the ledge 22 extends from the wall 24 into the cylinder bore opening 20. The ledge 22 is at the second side 18. The second layer 40 includes the ledge 22. In other words, the second layer 40 extends from the wall 24 inwardly toward the axis A of the cylinder bore opening 20.

The ledge 22 has an inner wall 62 extending axially along the cylinder bore opening 20. The ledge 22 extends from the wall 24 to the inner wall 62. The ledge 22 may be cylindrical about the axis A. Specifically, the inner wall 62 may be cylindrical, as shown in the Figures. The inner wall 62 may extend axially along the cylinder bore opening 20. In examples in which the wall 24 is cylindrical, the wall 24 may be annular about the axis A, i.e., the axis A is central. The wall 24 and the inner wall 62 may be concentric, i.e., may share a common axis A. As an example, the axis A may be central to the wall 24 and the inner wall 62.

The ledge 22 includes a surface 58 extending from the wall 24 to the cylinder bore opening 20. Specifically, the surface 58 extends from the wall 24 to the inner wall 62. The wire 14 is on the surface 58. In other words, the wire 14 rests on the surface 58 and abuts, i.e., in direct contact with, the surface 58 after the engine 32 is operated and the wax 26 is dissolved, as described further below. Before assembly to the cylinder block 28 and the cylinder head 30, the wax 26 may be between the wire 14 and the surface 58 or the wire 14 may abut the surface. When assembled to the cylinder block 28 and the cylinder head 30, the wire 14 is compressed between the surface 58 and one of the cylinder block 28 and the cylinder head 30. In the example in the Figures, the wire 14 is compressed between the surface 58 and the cylinder head 30.

The ledge 22 may have a groove 52 receiving the wire 14. Specifically, the wire 14 is nested in the groove 52. The wire 14 abuts the groove 52 after the engine 32 is operated and the wax 26 is dissolved. Before assembly to the cylinder block 28 and the cylinder head 30, the wax 26 may be between the wire 14 and the groove 52 or the wire 14 may abut the surface.

The groove 52 is endless around the axis A. The groove 52 may be round. For example, the groove 52 may be circular about the axis A.

The surface includes a proximate end 60 at the wall 24 and a distal end 62 at the cylinder bore opening 20. The groove 52 is spaced from the wall 24 between the wall 24 and the axis A. The groove 52 is between the proximate end 60 and the distal end 62. In other words, the proximate end 60 of the surface 58 extends from the wall 24 to the groove 52 and the distal end 62 of the surface 58 extends from the groove 52 to the cylinder bore opening 20. The proximate end 60 and the distal end 62 may be planar. The wall 24 may be perpendicular to the proximate end 60 of the surface 58. The cylinder bore opening 20 may be perpendicular to the ledge 22 at the ledge 22. Specifically, the cylinder bore opening 20 may be perpendicular to the proximate end 60 and the distal end 62 of the surface 58 of the ledge 22.

With reference to FIG. 2, as set forth above, the wire 14 is on the ledge 22. In the example shown in the Figures including the groove 52, the wire 14 is in the groove 52. Before and during assembly to the cylinder block 28 and the cylinder head 30, the wire 14 is retained on the ledge 22, e.g., in the groove 52, by the wax 26. The wire 14 extends along the wall 24. In other words, the wire 14 is endless between the wall 24 and the inner wall 62. The wire 14 generally follows the path of the wall 24. As an example, the wire 14 may be ring-shaped, i.e., an endless loop. The ring-shape may be circular, oval, etc. The groove 52 and the wire 14 have matching shapes around the axis A, e.g., both circular about the axis A. Accordingly, the wire 14 is seated in the groove 52 completely around the cylinder bore opening 20.

The wire 14 may have a round cross-section. Specifically, the wire 14 may have a circular cross-section. The wire 14 and the groove 52 may have the same cross-sectional shape such that the contours of the wire 14 and the groove 52 match in cross-section. In such examples, the cross-sectional size of the wire 14 and the groove 52 may match. As an example, the groove 52 may have a circular cross-section and the groove 52 may have a partial-circular cross-section sized to nest the wire 14.

The wire 14 is taller than the wall 24 before assembly to the cylinder block 28 and the cylinder head 30. Specifically, the wall 24 has a height H1 axially along the cylinder bore opening 20 and the wire 14 has a height H2 axially along the cylinder bore opening 20 greater than the height H1 of the wall 24. After assembly to the cylinder block 28 and the cylinder head 30, the wire 14 may be deformed to a different height relative to the wall 24.

The wire 14 may be metal. As an example, the wire 14 may be steel, steel alloy, etc.

The wax 26 adheres the wire 14 to the ledge 22. Specifically, in examples including the groove 52, the wax 26 adheres the wire 14 in groove 52. The wax 26 holds the wire 14 in place relative to the gasket 12 to resist movement of the wire 14 relative to the gasket 12. As an example, the wax 26 retains the position of the wire 14 relative to the gasket 12 so that the force of gravity does not move the wire 14 relative to the gasket 12 during handling of the cylinder head gasket assembly 10, e.g., during assembly to the cylinder block 28 and the cylinder head 30. Thus, the wax 26 ensures proper placement of the wire 14 relative to the gasket 12 during assembly of the cylinder head gasket assembly 10 to the cylinder block 28 and the cylinder head 30.

As one example, the wax 26 may encase the wire 14, i.e., may cover all surfaces of the wire 14. As other examples, the wax 26 may be on a portion of the cross-sectional circumference of the wire 14 and/or a portion of the wire 14 around the axis A. The location and amount of wax 26 is sufficient to retain the position of the wire 14 relative to the gasket 12. The wax 26 may have a uniform thickness or may have areas of relatively greater thickness. In examples including the groove 52, the wax 26 may be between the wire 14 and the groove 52.

The wax 26 may be of any suitable type. The wax 26 has a surface adhesion, i.e., adhesive force required to separate adhered surfaces, when adhered to the material type of ledge 22 to resist movement of the wire 14 relative to the ledge 22. Specifically, the surface adhesion prevents movement of the wire 14 relative to the ledge 22 during handling and assembly of the gasket 12.

As set forth above, the wax 26 retains the wire 14 relative to the gasket 12 during assembly to the cylinder block 28 and the cylinder head 30. The wax 26 is intended to retain the position of the wire 14 until assembly to the cylinder block 28 and the cylinder head 30 and is dissolved thereafter, i.e., the wax 26 is sacrificial. The wax 26 dissolves during initial operation of the engine 32. In other words, heat and/or fluids in the cylinder bore 34 dissolves the wax 26 by melting, burning, etc. Specifically, the wax 26 is designed to dissolve at an engine-operating temperature of the engine 32. During operation of the engine 32, heated fluid in the cylinder bore 34 generated by operation of the engine 32 dissolves the wax 26.

Assembly of the cylinder head gasket assembly 10 is shown in FIGS. 2-4. As shown in FIG. 2, the cylinder head gasket assembly 10 is placed on the cylinder block 28. As shown in FIG. 3, the cylinder head 30 is fastened to the cylinder block 28, squeezing the cylinder head gasket assembly 10 therebetween. The wire 14 and/or the convex surface 54 of the grooved portion 50 may deform when the cylinder head 30 is tightened to the cylinder block 28. The wax 26 may squeeze out from between the wire 14 and the cylinder head 30 and from between the wire 14 and the ledge 22 when the cylinder head 30 is tightened to the cylinder block 28. FIG. 4 shows the engine 32 after initial operation. As shown in FIG. 4, the wax 26 has dissolved during operation of the engine 32, as described above.

The disclosure has been described in an illustrative manner, and it is to be understood that the terminology which has been used is intended to be in the nature of words of description rather than of limitation. The adjectives "first" and "second" are used herein as identifiers and are not intended to indicate order or importance unless otherwise indicated. Many modifications and variations of the present disclosure are possible in light of the above teachings, and the disclosure may be practiced otherwise than as specifically described.

What is claimed is:

1. A cylinder head gasket assembly comprising:
   a gasket having a first side, a second side, and a cylinder bore opening extending through the first side and the second side;
   the gasket having a wall on the first side, the wall extending axially along the cylinder bore opening;
   the gasket having a ledge extending from the wall into the cylinder bore opening at the second side;
   a wire that is ring-shaped, the wire being on the ledge and extending along the wall; and
   wax adhering the wire to the ledge;
   the cylinder bore opening has an axis;
   the wall extends around the axis of the cylinder bore opening;
   the gasket has an inner wall extending around the axis of the cylinder bore opening;
   the ledge has a surface extending radially from the wall to the inner wall and terminating at the wall and the inner wall; and
   the wire is on the surface and the wax adheres the wire to the surface.

2. The cylinder head gasket assembly of claim 1, wherein the wax encases the wire.

3. The cylinder head gasket assembly of claim 1, wherein the wall has a height axially along the cylinder bore opening and the wire has a height axially along the cylinder bore opening greater than the height of the wall.

4. The cylinder head gasket assembly of claim 1, wherein the ledge has a groove receiving the wire.

5. The cylinder head gasket assembly of claim 1, wherein:
   the surface has a groove receiving the wire; and
   the surface is planar from the groove to the wall and from the groove to the inner wall.

6. The cylinder head gasket assembly of claim 5, wherein the inner wall is perpendicular to the surface.

7. The cylinder head gasket assembly of claim 5, wherein the wall is perpendicular to the surface.

8. The cylinder head gasket assembly of claim 4, wherein the wire has a round cross-section and the groove has a round cross-section sized to nest the wire.

9. The cylinder head gasket assembly of claim 1, wherein the gasket has a first layer on the first side and a second layer on the second side, the first layer including the wall and the second layer including the ledge.

10. The cylinder head gasket assembly of claim 9, wherein the first layer has a distal layer spaced from the second layer and a proximate layer between the second layer and the distal layer.

11. The cylinder head gasket assembly of claim 10, wherein the proximate layer abuts the distal layer and the second layer.

12. The cylinder head gasket assembly of claim 9, wherein the ledge has a groove receiving the wire and the wax.

13. The cylinder head gasket assembly of claim 9, wherein the first layer and the second layer are metal.

14. The cylinder head gasket assembly of claim 1, wherein the cylinder bore opening is perpendicular to the ledge at the ledge.

15. The cylinder head gasket assembly of claim 14, wherein the first side and the second side are planar.

16. The cylinder head gasket assembly of claim 1, wherein the wire is metal.

17. The cylinder head gasket assembly of claim 16, wherein the gasket is metal.

18. The cylinder head gasket assembly of claim 1, wherein the wall and the inner wall are concentric.

19. The cylinder head gasket assembly of claim 1, wherein the wax is designed to dissolve at an engine-operating temperature.

20. The cylinder head gasket assembly of claim 1, wherein the wall extends in one direction from the surface along the axis of the cylinder bore opening and the inner wall extends in an opposite direction from the surface along the axis of the cylinder bore opening.

* * * * *